US010210180B2

(12) United States Patent
Barel et al.

(10) Patent No.: US 10,210,180 B2
(45) Date of Patent: Feb. 19, 2019

(54) HYBRID NEAREST NEIGHBOR SEARCH TREE WITH HASHING TABLE

(71) Applicant: Intel Corporation, Santa Clara, CA (US)

(72) Inventors: Hila Barel, Tel Aviv (IL); Gilad Michael, Tzur Yizhak (IL); Hadas Dahan, Tel Aviv (IL)

(73) Assignee: Intel Corporation, Santa Clara, CA (US)

(*) Notice: Subject to any disclaimer, the term of this patent is extended or adjusted under 35 U.S.C. 154(b) by 477 days.

(21) Appl. No.: 14/959,304

(22) Filed: Dec. 4, 2015

(65) Prior Publication Data
US 2017/0161271 A1 Jun. 8, 2017

(51) Int. Cl.
*G06F 17/30* (2006.01)
*G06N 5/04* (2006.01)
*G06N 99/00* (2010.01)

(52) U.S. Cl.
CPC ...... *G06F 17/3025* (2013.01); *G06F 17/3033* (2013.01); *G06F 17/30327* (2013.01); *G06N 5/047* (2013.01); *G06N 99/005* (2013.01)

(58) Field of Classification Search
None
See application file for complete search history.

(56) References Cited

U.S. PATENT DOCUMENTS

| 7,475,071 | B1 | 1/2009 | Liu et al. |
| 2012/0117122 | A1 | 5/2012 | Wang et al. |
| 2012/0271833 | A1 | 10/2012 | Wang et al. |
| 2013/0261982 | A1 | 10/2013 | Zhang et al. |
| 2014/0358960 | A1 | 12/2014 | Levi |

OTHER PUBLICATIONS

Chakraborty et al. "A Layer Locality Sensitive Hashing . . . " May 2, 2014.*
Sykora, "Computer Assited Anaysis of Classical Cartoon Animations." Sep. 2006.*
International Search Report and Written Opinion for International Patent Application No. PCT/US2016/058896, dated Jan. 31, 2017.
X. Li , B. Gunturk and L. Zhang "Image Demosaicing: A Systematic Survey," Proc. SPIE, vol. 6822, pp. 68221J, 2008 (15 pages).
G. Michael and N. Kiryati "Example Based Demosaicing," 2014 IEEE International Conference on Image Processing (ICIP), Oct. 27-30, 2014, pp. 1832-1836.
International Preliminary Report on Patentability for International Patent Application No. PCT/US16/58896, dated Jun. 14, 2018.

* cited by examiner

*Primary Examiner* — Tuankhanh D Phan
(74) *Attorney, Agent, or Firm* — Green, Howard & Mughal LLP

(57) ABSTRACT

Techniques related to approximate nearest neighbor searching are discussed. Such techniques may include traversing an approximate nearest neighbor search tree from root node to a resultant leaf node while maintaining a priority queue of best matches, determining candidate entries for evaluation based on the resultant leaf node, and generating search results based on the priority queue and the candidate entries.

19 Claims, 9 Drawing Sheets

HYBRID NEAREST NEIGHBOR SEARCH TREE WITH HASHING TABLE

BACKGROUND

In many contexts, it may be necessary to find a closest point in a database to a given query point. For example, the data in the database may be represented as high dimensional points that reside in a metric space (a space such that distances between members are defined). The closest point to the given query point is defined based on a distance function. In some examples, a single closest point to the query point may be found and, in other examples, a number of closest points may be found. For example, the closest point or nearest neighbor (NN) problem may be generalized as a k-NN search where the goal is to find the k nearest neighbors to a given query point. In some applications, it may be sufficient to determine approximate nearest neighbors instead of guaranteeing the actual nearest neighbors in every case particularly when such techniques may offer the advantages of speed and/or a guaranteed maximum search time or the like. Such techniques may be characterized as approximate nearest neighbor (A-NN) searches.

A variety of techniques have been used and proposed for performing approximate nearest neighbor searches. The quality and usefulness of such techniques may be evaluated based on the time complexity of the search technique and the space complexity of the database or data structure being searched. Example techniques include KD (k-dimensional) trees and metric trees (e.g., vantage point trees). Such techniques provide data structures for organizing points in a multidimensional space that are useful for searching a multidimensional query point efficiently by eliminating large portions of the search space.

It may be advantageous to provide fast, efficient, and high quality searching for databases or data structures of multi-dimensional points. It is with respect to these and other considerations that the present improvements have been needed. Such improvements may become critical as the desire to provide database searching for nearest neighbors becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
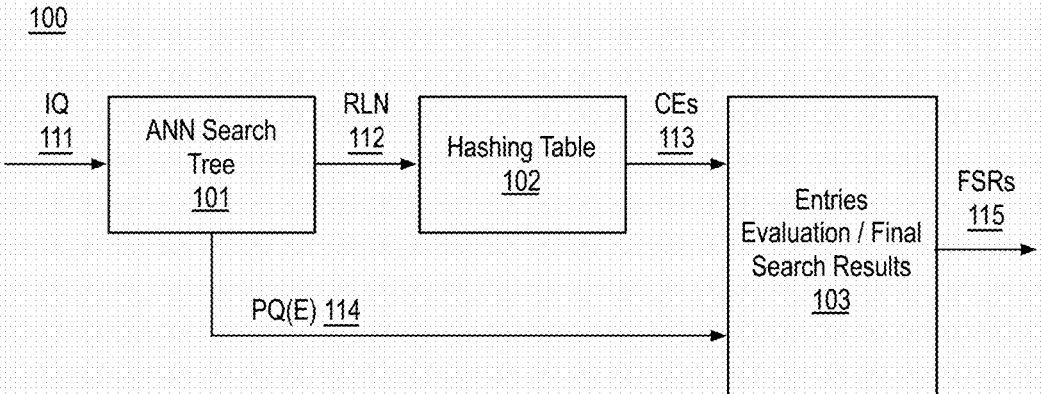
FIG. 1 illustrates an example device for performing approximate nearest neighbor searching.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to approximate nearest neighbor searching and, in particular, to a hybrid nearest neighbor search tree with a hashing table that provides candidate entries associated with leaf nodes of the search tree.

As described above, it may be advantageous to provide fast, efficient, and high quality searching for databases or data structures of multidimensional points. For example, it may be desirable to find one or more nearest neighbors in a database based on a query point. Furthermore, in some contexts, it may be sufficient to determine approximate nearest neighbors in exchange for increased speed and/or a guaranteed maximum search time or the like. Such techniques may have a wide range of applications such as in example based demosaicing (EBD), as is discussed further herein.

In some embodiments, generating or providing an approximate nearest neighbor searching structure may include generating an approximate nearest neighbor search tree representing entries of a database such that the approximate nearest neighbor search tree includes at least a root node and multiple leaf nodes. For example, entries of the database may be multidimensional points and such entries may be represented by the nodes of the search tree. A frequency distribution table may be generated such that the frequency distribution table includes a table location for each combination of an entry of the database and a leaf node of the approximate nearest neighbor search tree. The frequency distribution table may be populated, in a pre-training for example, with a frequency value for each table location based on a traversal of the approximate nearest neighbor search tree and an exhaustive nearest neighbor search of the database for each of a training set of queries. For example, the approximate nearest neighbor search tree may be traversed to determine a leaf node for a query and the exhaustive nearest neighbor search may be performed to determine an actual nearest neighbor for the query. For such a query, the table location associated with the leaf node and the actual nearest neighbor may be incremented. Such techniques may be provided for any number of training queries to populate the frequency distribution table.

Based on the frequency distribution table, for each leaf node, one or more candidate entries of the database may be determined. For example, a particular number of candidate entries of the database having the highest frequency (e.g., in the frequency distribution table) for each leaf node may be determined. Such candidate entries may be provided in a hashing table for example such that, upon implementation of the approximate nearest neighbor searching structure as is discussed further below, a resultant leaf node based on an input query may provide a key to the hashing table. The hashing table, based on the key, may provide pointers to one or more candidate entries for further evaluation to determine nearest neighbors for the input query.

In some embodiments, approximate nearest neighbor searching may include traversing, based on an input query, an approximate nearest neighbor search tree from a root node to a resultant leaf node of multiple leaf nodes of the approximate nearest neighbor search tree. For example, the approximate nearest neighbor search tree may include entries (e.g., multidimensional points) of a database to be searched. During the traversal of the approximate nearest neighbor search tree, a priority queue of best match entries may be maintained. For example, the priority queue may maintain a list of a particular number of closest database entries to the input query. As the approximate nearest neighbor search tree is traversed, if a node provides a closer entry than any of the entries in the priority queue, the entry associated with the node may be kept and the entry associated with a farthest distance from the input query may be discarded.

Based on the resultant leaf node, one or more candidate entries of the database may be determined such that the candidate entries are associated with the resultant leaf node. For example, a hashing table or the like may be accessed based on the resultant leaf node to determine pointers to the candidate entries of the database. As will be appreciated, the candidate entries may not have been evaluated during the traversal of the approximate nearest neighbor search tree. The candidate entries may be evaluated and the priority queue may be updated if any of the candidate entries provide closer results with respect to the input query than any of the members of the priority queue. The priority queue, generated based on the approximate nearest neighbor search tree traversal and the evaluation of the candidate entries as discussed, may be provided as approximate nearest neighbors to the input query.

Such techniques may provide an approximate nearest neighbor search structure such as a hybrid approximate nearest neighbor search structure that includes an approximate nearest neighbor search tree (e.g., a vantage point tree or the like) and a hashing (or hash) table that provides pointers to candidate entries associated with leaf nodes of the search tree. Such techniques may provide fast and efficient approximate nearest neighbor search results for high dimensional search data.

The techniques discussed herein (e.g., hybrid tree searching) may provide better results (e.g., smaller distances from the input query in the metric space in which the points being searched reside) for approximate nearest points as compared to other searches such as KD tree searching or vantage point tree searching for the same, given, fixed number of search steps. For example, when a search technique is implemented (in hardware or software), there may be timing limitations on the search such that the number of steps allowed until a final result is reached is fixed. Such limitations (and other concerns such as database size) may not allow for exhaustive searching, for example. In such contexts, approximate nearest neighbor searching using the discussed techniques may meet timing requirements and provide high quality search results.

FIG. 1 illustrates an example device 100 for performing approximate nearest neighbor searching, arranged in accordance with at least some implementations of the present disclosure. As shown in FIG. 1, device 100 may include an approximate nearest neighbor (ANN) search tree module 101, a hashing table module 102, and an entries evaluation/final search results module 103. Device 100 may be any suitable form factor device. For example, device 100 may be a computer, a laptop computer, a tablet, a smart phone, a phablet, digital camera, a display device, a gaming device, a wearable device such as a smart watch, smart glasses, or the like. In an example, device 100 may implement an image or video pipeline to generate demosaiced color patches based on input data from an image sensor as discussed herein. However, device 100 may implement any task associated with providing nearest neighbor search results for an input query based on a database. Furthermore, ANN search tree module 101 and/or hashing table module 102 may be generated by device 800 as discussed further herein.

As shown, ANN search tree module 101 may receive an input query (IQ) 111. Input query 111 may be any suitable input query for searching a database of entries represented by or associated with an ANN search tree being implemented by ANN search tree module and a hashing table being implemented by hashing table module 102. For example, input query 111 may be a multidimensional input query. ANN search tree module 101 may evaluate input query 111 and ANN search tree module 101 may traverse an ANN search tree from a root node to a resultant leaf node (RLN) 112 based on input query 111. During traversal of the ANN search tree by ANN search tree module 101, ANN search tree module 101 may maintain a priority queue of best match entries (PQ(E)) 114. For example, the ANN search tree being traversed by ANN search tree module 101 may include entries of a database to be searched and priority queue of best match entries 114 may include entries associated with traversed nodes that are closest to input query 111. ANN search tree module 101 traverse any suitable search tree that represents entries of the database to be searched. In some examples, the search tree is a balanced vantage point search tree. Furthermore, the database to be searched may include any suitable database including any suitable number of entries. For example, the entries of the database may be multidimensional points that reside in a metric space.

For example, the ANN search tree traversal by ANN search tree module 101 based on input query 111 may include a single unidirectional traversal of the ANN search tree. During the traversal, priority queue of current best match entries 114, which may hold the K minimum-distance points (e.g., the database entries at traversed nodes having a minimum-distance with respect to the input query), may be maintained and updated at every node along the traversal based on input query 111. The distance between input query 111 and the database entry associated with a particular node may be any suitable distance function, metric, or distance such as a Euclidian distance. Furthermore, priority queue of best match entries 114 may maintain any number of best match entries such as 8, 10, or 16 entries or the like. Such a search or traversal of the ANN search tree by ANN search tree module 101 may stop at resultant leaf node 112.

As shown in FIG. 1, resultant leaf node 112 based on input query 111 may be provided to hashing table module 102. Hashing table module 102, based on resultant leaf node 112, may generate one or more candidate entries (CEs) 113. For example, hashing table module 102 may receive resultant leaf node 112 and may use resultant leaf node 112 as a key to a hashing table to determine pointers to candidate entries 113 such that candidate entries 113 are entries of the database represented by the ANN search tree. For example, resultant leaf node 112 may be or may provide an index for hashing table module 102, which may fetch M candidates associated with resultant leaf node 112 based on accessing a hashing table. For example, hashing table module 102 may access an appropriate cell of the hashing table based on the index of resultant leaf node 112 to determine pointers to candidate entries 113 or candidate entries 113 themselves. Since hashing table module 102 may implement pointers to candidate entries, the size of the hashing table may be relatively small, allowing for ease and low cost of implementation.

Entries evaluation/final search results module 103 may receive priority queue of best match entries 114 and candidate entries 113 and entries evaluation/final search results module 103 may generate final search results (FSRs) 115. For example, final search results 115 may include the best K entries based on minimum distances with respect to input query 111. Final search results 115 may include the same number of entries as priority queue of best match entries 114 or they may contain different numbers of entries. In some embodiments, entries evaluation/final search results module 103 may determine entries associated with minimum distances (e.g., K entries having minimum distances associated therewith) between all entries of priority queue of best match entries 114 and candidate entries 113. Such final search results 115 may be determined using any suitable technique or techniques. In some examples, a distance from input query 111 may be determined for each of candidate entries 113 and, if any of such distances are less than the distances of priority queue of best match entries 114, such entries may replace entries of priority queue of best match entries 114 having the largest distances.

Figure 2:
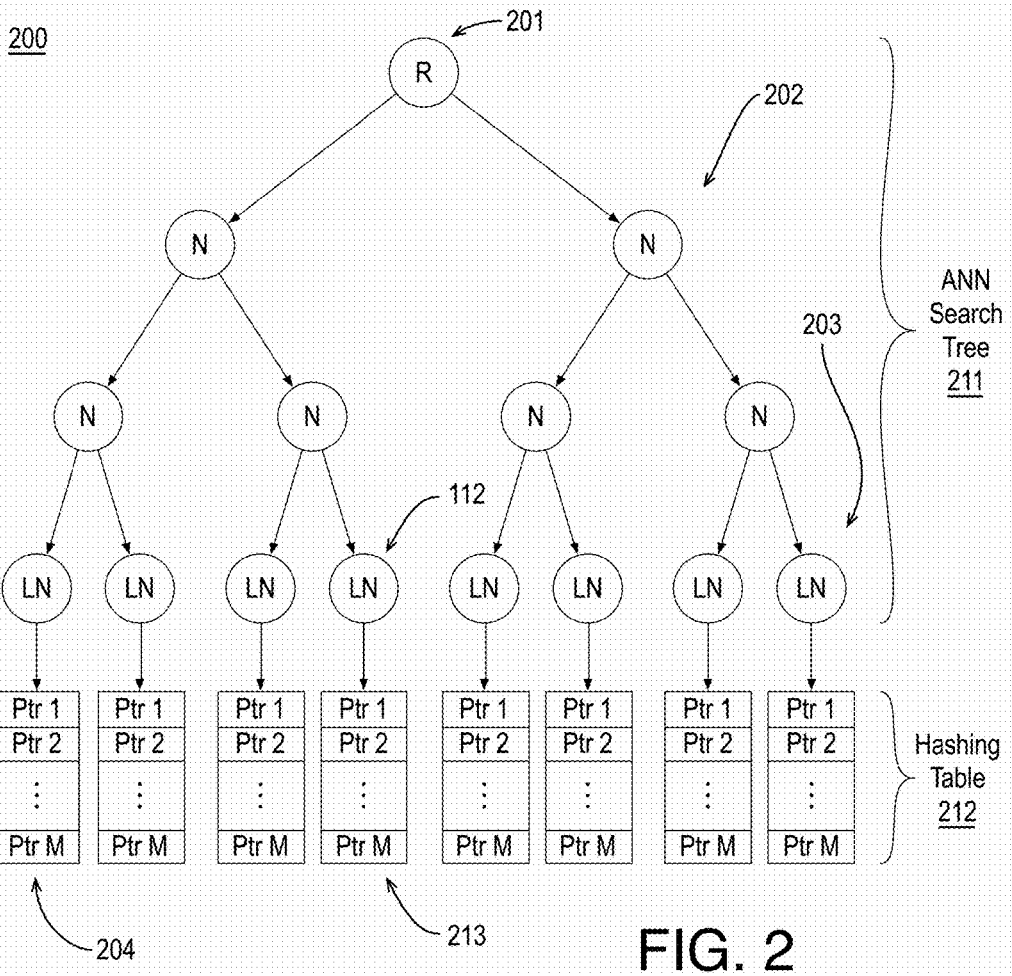
FIG. 2 illustrates an example approximate nearest neighbor searching structure including an approximate nearest neighbor search tree and a hashing table.

FIG. 2 illustrates an example approximate nearest neighbor searching structure 200 including approximate nearest neighbor search tree 211 and hashing table 212, arranged in accordance with at least some implementations of the present disclosure. As shown in FIG. 2, approximate nearest neighbor searching structure 200 may include ANN search 211, which may include nodes 202 including a root node 201 and leaf nodes 203. ANN search tree 211 may include any suitable search tree such as a balanced vantage point search tree or the like. Furthermore, approximate nearest neighbor searching structure 200 may include hashing table 212, which may include pointers 204 (e.g., labeled Ptr 1-M). For example, pointers 204 may include pointers to candidate entries as discussed above such that the candidate entries are represented by nodes 202, but may not have traversed during the traversal of ANN search tree 211. As shown, a portion or cell or column or the like of hashing table 212 may be associated with each of leaf nodes 203.

In some examples, all database entries for a database to be represented by approximate nearest neighbor searching structure 200 (e.g., any suitable database) may be stored in nodes 202 such that each database entry is associated with a particular node of nodes 202. Furthermore, hashing table 212 may include pointers 204 (e.g., indices) to candidate entries from the database. Such candidate entries may be determined using any suitable technique or techniques such as those discussed herein. For example, such candidate entries may be determined based on a pre-training using a training set of input queries as is discussed with respect to FIG. 8 and elsewhere herein.

In operation, as discussed with respect to FIG. 1, ANN search tree 211 may be traversed based on an input query such as input query 111. For example, at root node 201, a distance between input query 111 and the database entry of root node 201 may be determined. Furthermore, the database entry of root node 201 may be added to priority queue of best match entries 114. Based on a comparison of the determined distance to a threshold (e.g., a threshold determined during the generation of ANN search tree 211), a determination may be made as to which node (e.g., left or right) input query may be passed to from root node 201. At the subsequent node, a distance between input query 111 and the database entry of the subsequent node may be determined. Furthermore, the database entry of the subsequent node may be added to priority queue of best match entries 114 (if the queue is not yet full) or the distance may be compared to the distances of priority queue of best match entries 114. If the distance is less than any entry, the database entry of the subsequent node may be added to priority queue of best match entries 114 and the entry with the maximum distance may be discarded.

Such processing may continue as input query 111 traverses nodes 202 to a resultant leaf node (e.g., resultant leaf node 112) of leaf nodes 203. Also, as discussed, such processing may provide for priority queue of best match entries 114, which may be generated and maintained during the traversal. Based on resultant leaf node 112 or an index or key or the like associated with resultant leaf node 112, hashing table 212 may be accessed to determine pointers 213 associated with resultant leaf node 112. Based on pointers 213, candidate entries 113 may be determined. Such candidate entries 113 may include entries of the database and may be identified by pointers 213 indicating particular nodes of ANN search tree 211 or the like. As discussed, such candidate entries 113 and priority queue of best match entries 114 may be evaluated to provide final search results such as final search results 115 including a particular number of best matches (e.g., entries having the smallest distances) based on input query 111.

As discussed, at particular nodes of nodes 202 (e.g., during traversal) of approximate nearest neighbor search tree module 101, priority queue of best match entries 114 may be updated and a next node may be determined.

Figure 3:
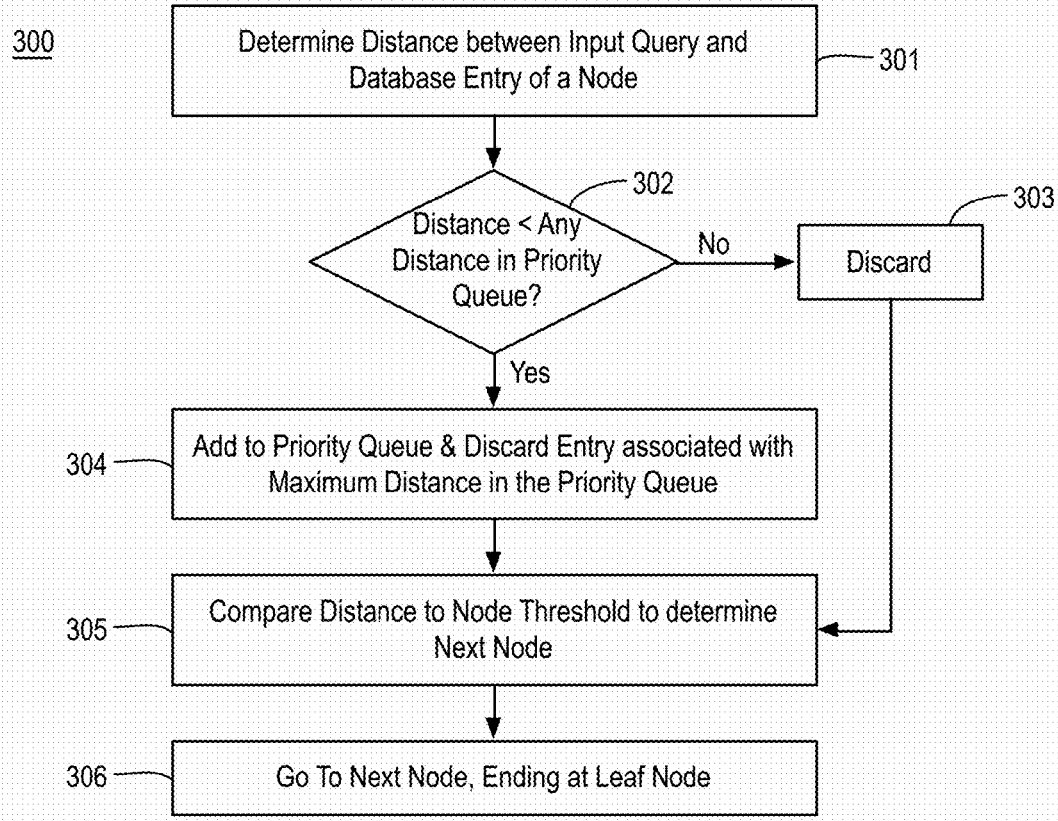
FIG. 3 illustrates an example process for node processing in an approximate nearest neighbor search tree.

FIG. 3 illustrates an example process 300 for node processing in an approximate nearest neighbor search tree, arranged in accordance with at least some implementations of the present disclosure. Process 300 may include one or more operations 301-306 as illustrated in FIG. 3. Process 300 or portions thereof may be performed by a device (e.g., device 100 or any other device or system discussed herein) to maintain a priority queue of best match entries at a node of an approximate nearest neighbor search tree. Process 300 or portions thereof may be repeated for any number nodes of a search tree.

As shown, process 300 may begin at operation 301, where a distance may be determined between an input query and a database entry of a node (e.g., a current node). For example, the node may be accessed during a unidirectional traversal of an approximate nearest neighbor search tree including the node. Processing may continue at decision operation 302, where a determination may be made as to whether the distance determined at operation 301 is less than any distance in a priority queue. For example, the priority queue may include a list of best match entries and their associated distances such that the priority queue is maintained during the traversal of the approximate nearest neighbor search tree.

If the distance determined at operation 301 is not less than any distance in the priority queue, the database entry of the current node may be discarded and processing may continue at operation 305 as discussed below. If the distance determined at operation 301 is less than any distance in the priority queue, the database entry and distance of the current node may be added to the priority queue and the database entry associated with a maximum distance in the priority queue may be discarded. For example, the database entry of the current node may replace the previous database entry that was the furthest from the input query. It is noted that the processing discussed with respect to decision operation 302 and operations 303 and 304 may be performed when the priority queue is full. If the priority queue is not yet full (e.g., a maximum number of entries has not been reached), decision operation 302 and operations 303 and 304 may be skipped and the distance and entry of the node may be added (e.g., without evaluation) until the priority queue is full.

As shown, processing may continue from operation 303 or operation 304 at operation 305, where the distance determined at operation 301 may be compared to a threshold of the current node to determine a next node. For example, the threshold comparison may determine a next node for processing in the approximate nearest neighbor search tree. The node threshold may be determined during the generation of the approximate nearest neighbor search tree for example. Based on the determined next node, process 300 may continue at operation 306 until a resultant leaf node is reached. When the resultant leaf node is reached, process 300 may end and subsequent processing such as determining candidate entries and evaluating such entries may proceed. For example, as discussed with respect to entries evaluation/final search results module 103, candidate entries such as candidate entries 113 may be evaluated along with best match entries such as priority queue of best match entries 114.

Figure 4:
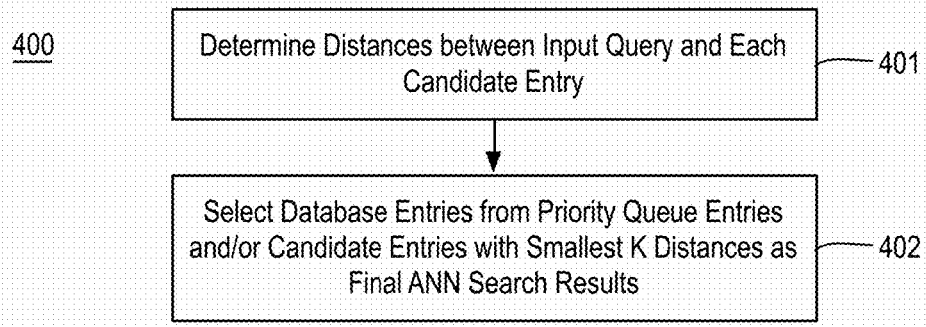
FIG. 4 illustrates an example process for generating final search results based on a priority queue and candidate entries.

FIG. 4 illustrates an example process 400 for generating final search results based on a priority queue and candidate entries, arranged in accordance with at least some implementations of the present disclosure. Process 400 may include one or more operations 401 and 402 as illustrated in FIG. 4. Process 400 or portions thereof may be performed by a device (e.g., device 100 or any other device or system discussed herein) to generate final search results for a hybrid approximate nearest neighbor search. Process 400 or portions thereof may be repeated for any number searches of an approximate nearest neighbor structure or the like. For example, process 400 may be performed after traversal of an approximate nearest neighbor search tree such that a priority queue has been generated and maintained and after candidate entries have been identified via a hashing table or the like.

As shown, process 400 may begin at operation 401, where distances between an input query such as input query 111 and each candidate entry such as each candidate entry of candidate entries 113 may be determined. For example, M distances may be determined based on a comparison of each of M candidate entries to the input query. Processing may continue at operation 402, where database entries from the priority queue and/or the candidate entries with the smallest K distances may be selected as final approximate nearest neighbor search results. Operation 402 may be performed using any suitable technique or techniques. In some examples, the priority queue may include distances that have previously been attained. At operation 402, a determination may be made as to whether any of the distances determined at operation 401 (e.g., candidate entry distances) are less than any of the previously attained priority queue distances. If so, candidate entries associated with such smaller distances determined at operation 401 may be included in the final search results and may replace priority queue entries associated with largest distances, which may be discarded. For example, operation 402 may retain database entries from the priority queue and/or the candidate entries that are associated with the smallest K distances where K is any number such as 1, 8, 10, 16, or the like.

As discussed, the approximate nearest neighbor search techniques and devices discussed herein may have a wide range of implementations. In particular, nearest neighbor search techniques may have many applications in image processing and computer vision. In some contexts, the approximate nearest neighbor search techniques discussed herein may advantageously limit search times and/or provide constant search times. In an embodiment, approximate nearest neighbor search techniques discussed herein may be implemented in the context of example based demosaicing.

Figure 5:
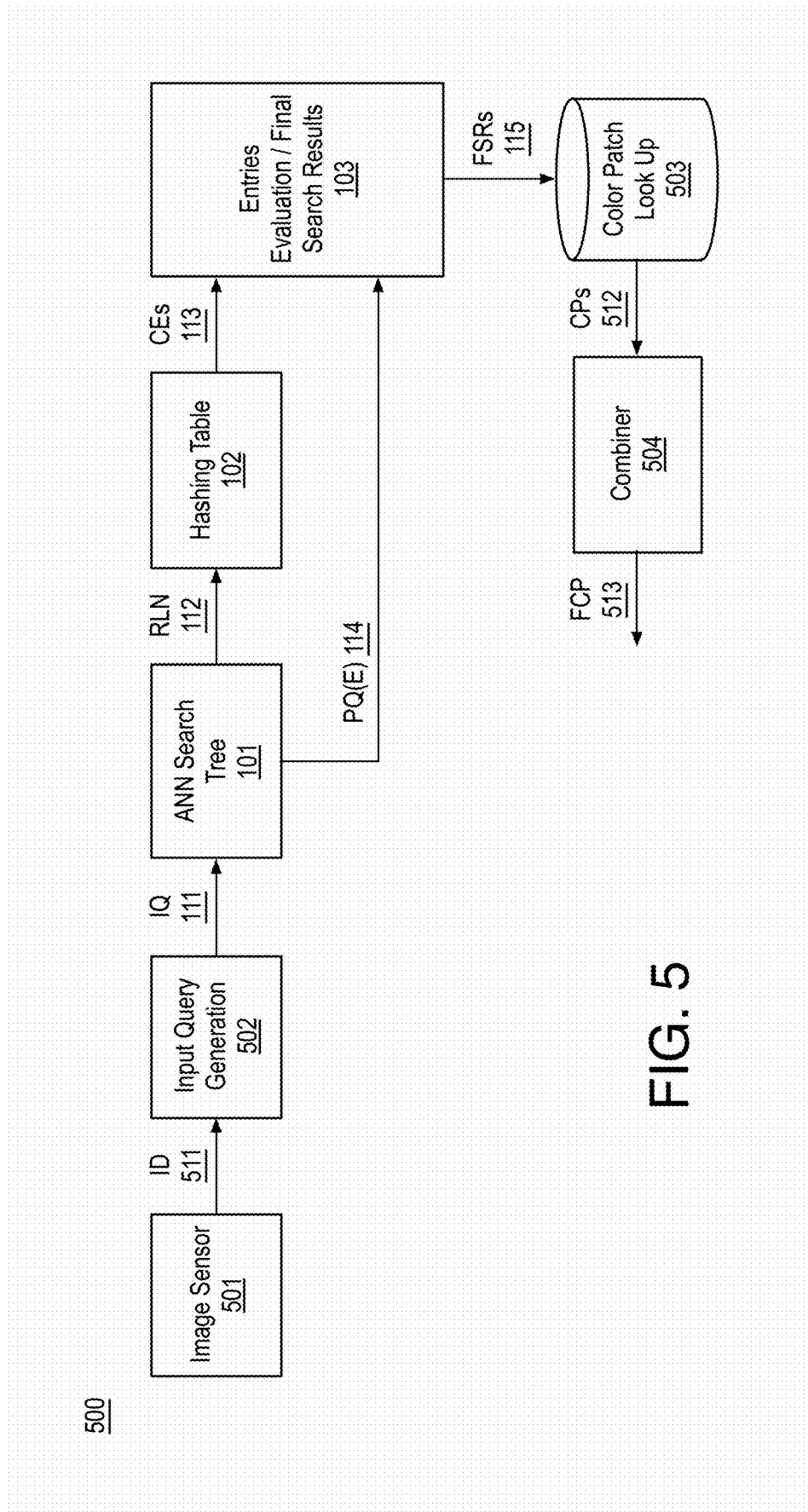
FIG. 5 illustrates an example device for performing example based demosaicing.

FIG. 5 illustrates an example device 500 for performing example based demosaicing, arranged in accordance with at least some implementations of the present disclosure. As shown in FIG. 5, device 500 may include an image sensor 501 to generate image data (ID) 511, an input query generation module 502, ANN search tree module 101, hashing table module 102, entries evaluation/final search results module 103, color patch look up module 503, and a combiner 504 to generate a final color patch (FCP) 513. Device 500 may be any suitable form factor device such as a computer, a laptop computer, a tablet, a smart phone, a phablet, digital camera, a display device, a gaming device, a wearable device such as a smart watch, smart glasses, or the like. In an example, device 500 may implement an image or video pipeline to generate demosaiced color patches (e.g., final color patches) based on input data (e.g., image data) from image sensor 501 as discussed herein.

As shown, device 500 may provide demosaicing of image data 511 attained from image sensor 501 to generate final color patch 513 based on a patch of image data 511. For example, device 500 may implement a pre-generated database or dictionary of patches such as Bayer patches representative of patches from an image sensor. Furthermore, each patch of the database or dictionary may be associated with a pre-determined color patch such that the color patch associated with the patch representing the image sensor data may provide a desired demosaicing of the patch to the color patch. For example, based on a patch of image data 511, it may be desirable to find, within the database or dictionary of patches, a number of best matches. From the best matches, associated color patches may be fetched and combined to provide final color patch 513 for the patch of image data 511. Such processing may provide demosaicing for the patch of image sensor data to a final color patch. An important feature of such demosaicing is the accuracy of final search results 115 based on the patch of image data 511.

Figure 6:
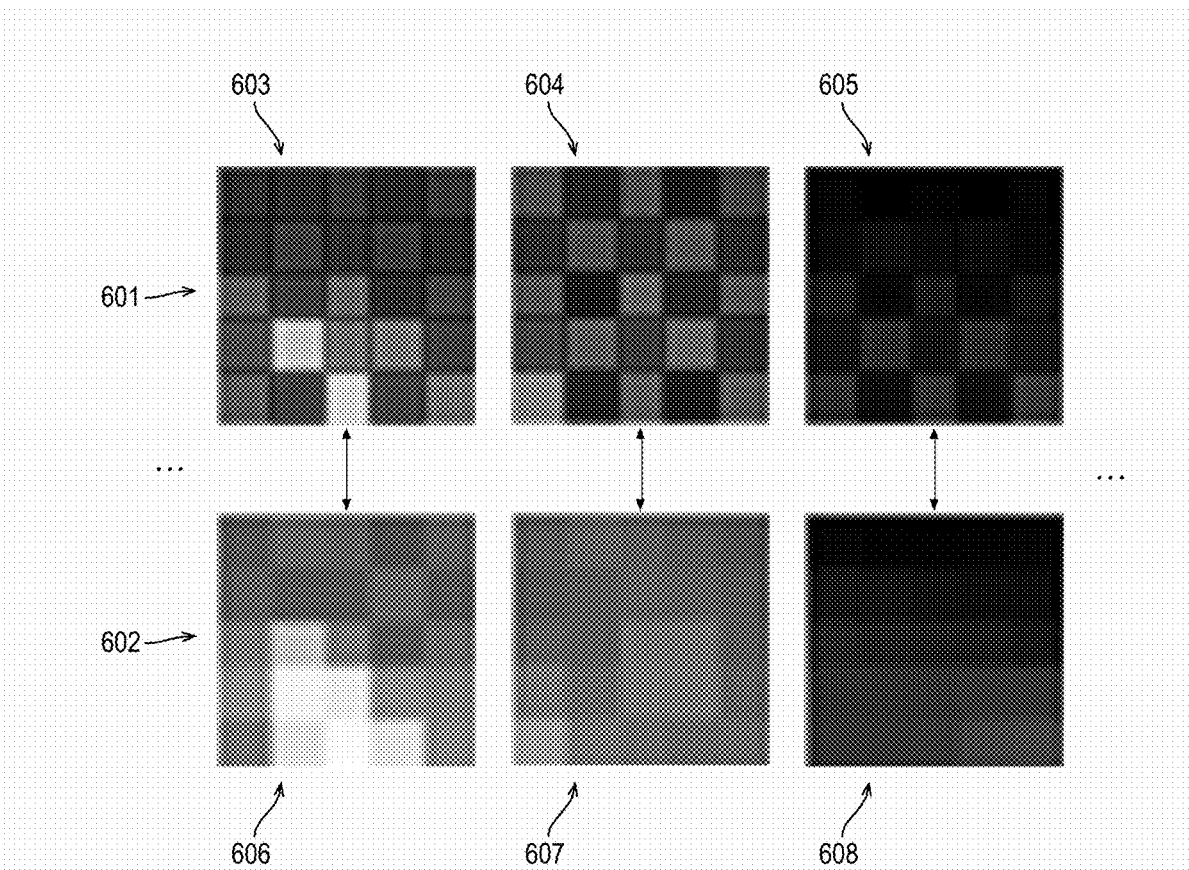
FIG. 6 illustrates an example dictionary of example patches and associated color patches.

FIG. 6 illustrates an example dictionary 601 of example patches 603-605 and associated color patches 606-608, arranged in accordance with at least some implementations of the present disclosure. For example, patches 603-605 may be pre-generated or pre-selected and may represent patches from an image sensor. Dictionary 601 may include any number of example patches 603-605. Furthermore, patches 603-605 may be selected to cover a wide range of possible patches that may be attained from an image sensor and to cover with greater density those possible patches that are more likely to be attained from an image sensor. The patches such as patches 603-605 within dictionary 601 may each be represented by a multidimensional data point (e.g., a 25-dimensional data point with each point associated with a pixel of patches 603-605) such that dictionary 601 may be represented by a database of multidimensional data point entries. During demosaicing, such a database may be searched for nearest neighbors as discussed herein.

As also shown in FIG. 6, each of patches 603-605 may have an associated color patch from associated color patches 602. For example, patch 603 may be associated with color patch 606, patch 604 may be associated with color patch 607, patch 605 may be associated with color patch 608, and so on. For example, patch 603 may be translate (e.g., demosaic) to color patch 606, patch 604 may be translate (e.g., demosaic) to color patch 607, patch 605 may be translate (e.g., demosaic) to color patch 608, and so on. In the examples discussed herein, multiple best match patches (e.g., based on a patch from an image sensor) may be determined, their associated color patches fetched, and the color patches may be combined (e.g., by averaging or the like) to provide a color patch for the patch from the image sensor. As will be appreciated, both patches 603-605 and color patches 606-608 as well as patch 711 and color patch 712 of FIG. 7 may include color during implementation, which is not shown for the sake of clarity of presentation.

Returning to FIG. 5, as shown, image sensor 501 may generate image data 511. For example, image sensor 501 as implemented via a camera module or optics or the like may be exposed to a scene and image sensor 501 may generate image data 511 representative of the scene. Image sensor 501 may include any suitable image sensor. Furthermore, image data 511 may include image data in any suitable format. In some examples, image data 111 may be characterized as image sensor data, captured image data, raw image data, or the like. In some examples, image data 511 may include image data in a format representative of a Bayer pattern or other similar pattern. For example, image sensor 501 may have a color filter array (CFA) overlaying the sensor. For example, image data 511 may include, for each pixel of image data 511 a pixel value corresponding to the color filter associated with the pixel.

Input query generation module 502 may receive image data 511 from image sensor 101 or memory or a preprocessor (not shown) and input query generation module 502 may generate input query 111. Input query generation module 502 may generate input query 111 using any suitable technique or techniques. For example, input query generation module 502 may, for a 5×5 patch of image data 511, generate a 25-dimensional input query based on a combination of the value for each location of the 5×5 patch.

Similarly, ANN search tree module 101 and hashing table module 102 may represent or include, for example via an ANN search tree and hashing table such as those discussed with respect to FIG. 2, 25-dimensional data points representative of a database or dictionary of 25-dimensional points such as a database representative of a dictionary of patches as discussed with respect to FIG. 6. As shown in FIG. 5, ANN search tree module 101, hashing table module 102, and entries evaluation/final search results module 103 may generate final search results 115 as discussed herein. For example, ANN search tree module 101 may receive input query 111 representative of a patch of image data 511 and ANN search tree module 101 may traverse an ANN search tree from a root node to resultant leaf node 112 such that priority queue of best match entries 114 may be maintained during the traversal. Furthermore, hashing table module 102 may receive resultant leaf node 112 and hashing table may provide candidate entries 113 or pointers to candidate entries 113 based on accessing a hashing table or the like. For example, in the context of FIG. 5, ANN search tree may include nodes representing or including entries that are multidimensional data points representing patches of dictionary 601 or the like. Furthermore, hashing table module 102 may point to or provide candidate entries that are multidimensional data points representing patches of dictionary 601 or the like. Entries evaluation/final search results module 103 may receive priority queue of best match entries 114 and candidate entries 113 and entries evaluation/final search results module 103 may provide final search results 115 as discussed herein. For example, final search results 115 may include the K closest database entries to input query 111.

As shown, color patch look up module 503 may receive final search results 115 and color patch look up 503 may provide color patches (CPs) 512 such that color patches 512 are the color patches associated with final search results 115. For example, each nearest neighbor entry of final search results 115 may have a corresponding color patch of color patches 512. Color patches 512 and final color patch 513 may include any suitable data structure representing color patches such as an RGB data structure or the like. For example, color patches 512 and final color patch 513 may be RGB color patches. Combiner 504 may receive color patches 512 and combiner 504 may combine (e.g., via weighted averaging or the like) color patches 512 to generate a final color patch 513. Thereby, device 500 may generate raw image data 511, which may be translated to input query 111 such that K approximate nearest neighbors (e.g., final search results 115) may be determined as discussed herein. Based on the K approximate nearest neighbors, associated color patches may be determined and combined to generate a final color patch. The operations discussed with respect to FIG. 5 may be repeated for any number of patches of image data 511 to generate a demosaiced image.

Figure 7:
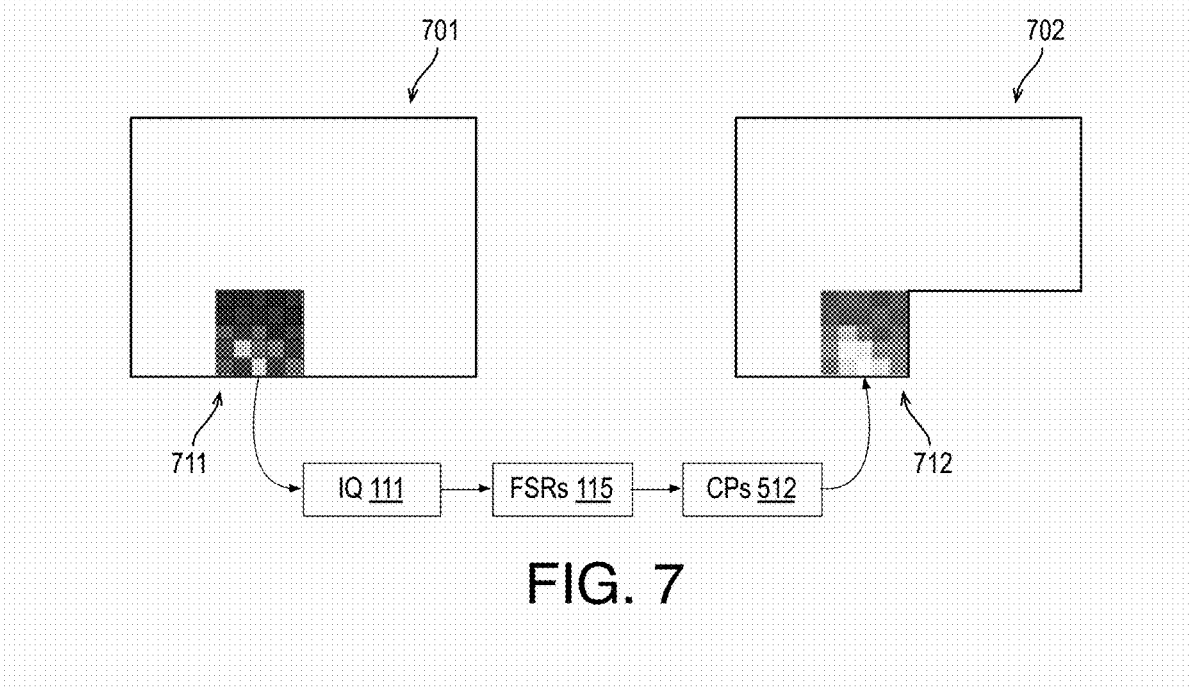
FIG. 7 illustrates an example of sensor output raw image data being demosaiced to form an example based demosaiced (EBD) image.

FIG. 7 illustrates an example of sensor output raw image data 701 being demosaiced to form an example based demosaiced (EBD) image 702, arranged in accordance with at least some implementations of the present disclosure. As shown in FIG. 7, input query 111 may be generated based on a patch 711 (e.g., a Bayer patch or the like) of raw image data 701. For example, raw image data 701 may be an image pulled from an image sensor and may be represented by image data 511 or the like. Patch 711 may be any suitable size such as 5×5 pixels as discussed herein and input query 111 may be any suitable input query such as a 25-dimensional point representative of patch 711. Also as shown, final search results 115 may be determined based on input query 111 using the techniques discussed herein. Furthermore, color patches 512 associated with final search results 115 may be fetched and combined as discussed with respect to color patch look up module 503 and combiner 504 to generate a color patch 712 of demosaiced image 702.

Such processing may be repeated for any number of patches of raw image data 701 to generate demosaiced image 702. Demosaiced image 702 may be provided for subsequent processing via an image processor, for display to a user, to memory, or the like. When applied to example based demosaicing, the discussed hybrid approximate nearest neighbor search techniques may provide for improved subjective results in demosaiced image 702 as the search provides higher accuracy search results as compared to other search techniques using the same number of search steps or the same amount of search time.

Figures 8, 9:
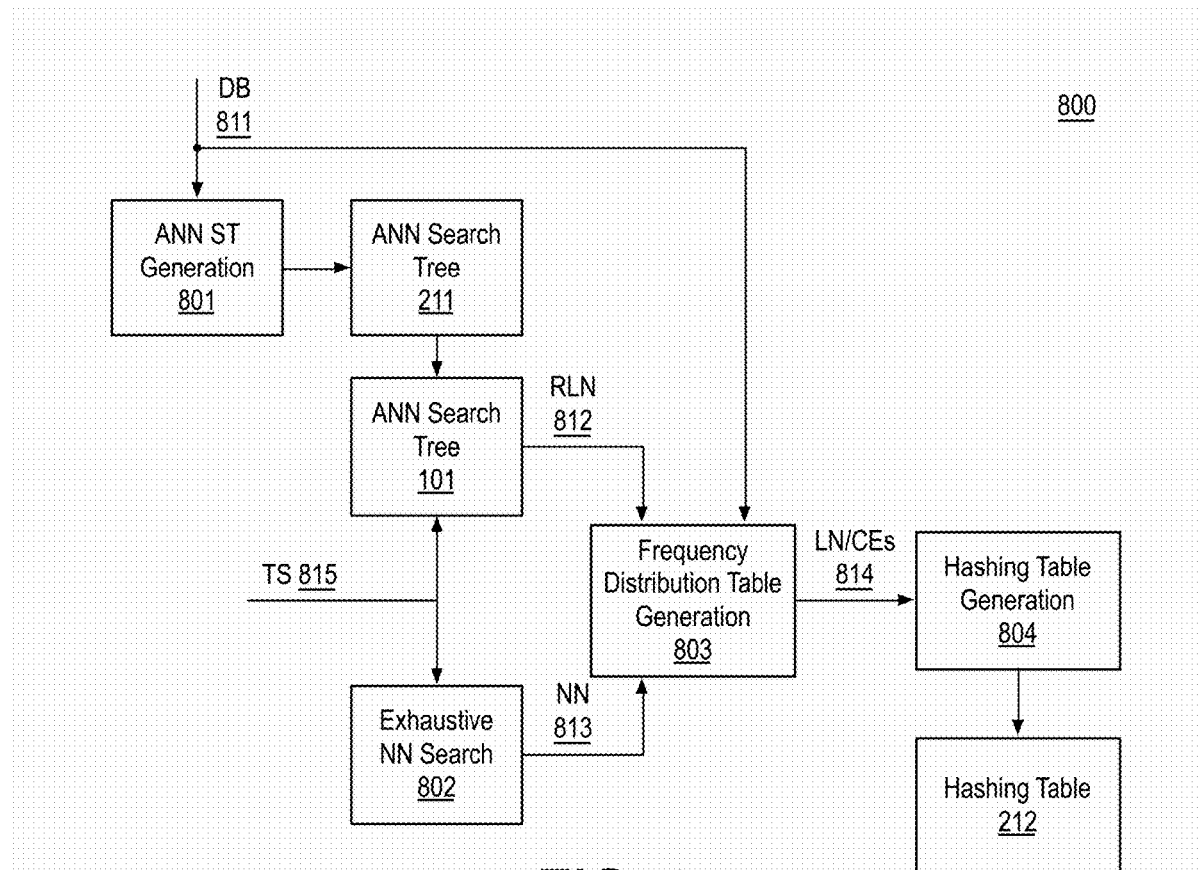
FIG. 8 illustrates an example device for generating an approximate nearest neighbor searching structure.
FIG. 9 illustrates an example frequency distribution table.

FIG. 8 illustrates an example device 800 for generating an approximate nearest neighbor searching structure, arranged in accordance with at least some implementations of the present disclosure. As shown in FIG. 8, device 800 may include an approximate nearest neighbor (ANN) search tree (ST) generation module 801 to generate ANN search tree 211, ANN search tree module 101, an exhaustive nearest neighbor (NN) search module 802, a frequency distribution table generation module 803, and a hashing table generation module 804 to generate hashing table 212. Device 800 may be any suitable form factor device such as a computer, a laptop computer, a tablet, a smart phone, a phablet, digital camera, a display device, a gaming device, a wearable device such as a smart watch, smart glasses, or the like.

As shown, ANN ST generation module 801 and frequency distribution table generation module 803 may receive a database (DB) 811. Database 811 may include any suitable database for representation via an approximate nearest neighbor searching structure. For example, database 811 may be a pre-generated database of points. For example, database 811 may include any number of entries of points such as multidimensional points or the like. ANN ST generation module 801 may generate ANN search tree 211 using any suitable technique or techniques. For example, as discussed, ANN search tree 211 may include at least a root node and multiple leaf nodes. In some examples, ANN search tree 211 is a balanced vantage point search tree. In an example, ANN search tree 211 is a balanced vantage points such that the vantage points are selected as the centroid of each set to be partitioned.

Frequency distribution table generation module 803 may generate and populate a frequency distribution table using any suitable technique or techniques. For example, frequency distribution table generation module 803 may generate a frequency distribution table having a table location for each combination of an entry of database 811 and a leaf node of ANN search tree module 101. In an example, the frequency distribution table is an (n/2)×(n) table having columns that are all of the n possible database entries of database 811 and rows that are n/2 search tree leaf nodes (which are also database entries). Such examples of rows being n/2 may assume a balanced tree. Generally, the number of rows will be the number of leaf nodes in the tree. The frequency distribution table, after population, may provide the probability of a true nearest neighbor given the leaf node that was reached after a single traversal of the search tree.

FIG. 9 illustrates an example frequency distribution table 900, arranged in accordance with at least some implementations of the present disclosure. As shown in FIG. 9, frequency distribution table 900 may include table entries 901 including a table entry for each combination of database entries 902 (e.g., labeled E) and leaf lodes 903 (e.g., labeled N). In the illustrated example, frequency distribution table 900 includes table entries 901 for 8 database entries 902 and 4 leaf nodes 903; however, frequency distribution table 900 may include any number of table entries 901. Furthermore, in the illustrated example, database entries 902 have twice as many members as leaf nodes, which may be the case for balanced trees such as a balanced vantage point search tree.

Returning to FIG. 8, as shown, a training set (TS) of inquiries 815 may be provided to ANN search tree module 101 and exhaustive NN search module 802. Training set 815 may include any suitable training set. For example, training set 815 may include a large training set of real life inquiries. ANN search tree module 101 may provide, based on an input query from training set 815, a traversal of ANN search tree 211 from a root node to a resultant leaf node (RLN) 812 as discussed herein. For example, the traversal of ANN search tree module 101 may be a single unidirectional traversal of ANN search tree 211. Resultant leaf node 812, in this context, may be considered an actual nearest neighbor guess for the input query from training set 815. Exhaustive NN search module 802 may provide, based on an input query from training set 815, an exhaustive search of database 811 such that exhaustive NN search module 802 may determine an actual nearest neighbor (NN) 813 for the input query from training set 815. Based on resultant leaf node 812 and actual nearest neighbor 813, frequency distribution table generation module 803 may populate the frequency distribution table for the current input query from training set 815 by, for example, incrementing a table entry (e.g., by 1) of the frequency distribution table associated with resultant leaf node 812 and actual nearest neighbor 813.

For example, with reference to FIG. 9, if resultant leaf node 812 (e.g., the resultant leaf node based on traversing ANN search tree 211 using the input query) is leaf node $N_2$ and actual nearest neighbor 813 (e.g., the actual nearest neighbor based on the input query) is database entry $E_5$, table entry $F_{25}$ (e.g., a frequency associated with leaf node 2 and database entry 5) may be incremented (e.g., by 1 or the like). Such processing via device 800 may be repeated for all or many of the input queries of training set 815 to populate table entries 901 with frequencies $F_{11}$-$F_{48}$. For example, based on such processing, frequency distribution table 900 may provide, for each leaf node, a ranking of database entries from highest frequency of providing a nearest neighbor to lowest. For exemplary purposes, with respect to leaf node $N_2$, the ranking from highest to lowest frequency may be: $F_{25}$, $F_{23}$, $F_{27}$, $F_{28}$, $F_{21}$, $F_{24}$, $F_{22}$, $F_{26}$.

Returning again to FIG. 8, frequency distribution table generation module 803 may provide combinations of leaf nodes and candidate entries (LN/CEs) 814 to hashing table generation module 804. The number of candidate entries for each leaf node in leaf nodes and candidate entries 814 may be any suitable number with greater numbers increasing search quality but requiring greater search time (e.g., during implementation). For example, the number of candidate entries may be 8, 16, 32, or the like. Continuing the example of FIG. 9, if 4 candidate entries for each leaf node are used, for leaf node $N_2$, the candidate entries may be: $F_{25}$, $F_{23}$, $F_{27}$, and $F_{28}$.

As shown, hashing table generation module 804 may receive leaf nodes and candidate entries 814 and may generate hashing table 212 based on leaf nodes and candidate entries 814. For example, hashing table generation module 804 may provide, based on an index or key of each leaf node, pointers to the candidate entries associated with the leaf node. With reference to FIG. 2, pointers 213 associated with leaf node 112 may point to the M highest frequency candidate entries for leaf node 112 in leaf nodes and candidate entries 814. For example, hashing table module 102 may, as discussed, be implemented with a key that is the leaf node index and the values are the most common M database indices associated with each leaf node.

The techniques discussed herein may efficiently provide for improved approximate nearest neighbor search results. For example, the search time for generating final search results may be log(n)+M, where n is the database size, log(n) is the tree depth, and M is the length (number of columns) of the hashing table. Thereby, the techniques discussed herein may provide for high quality search results in a guaranteed search time.

Figure 10:
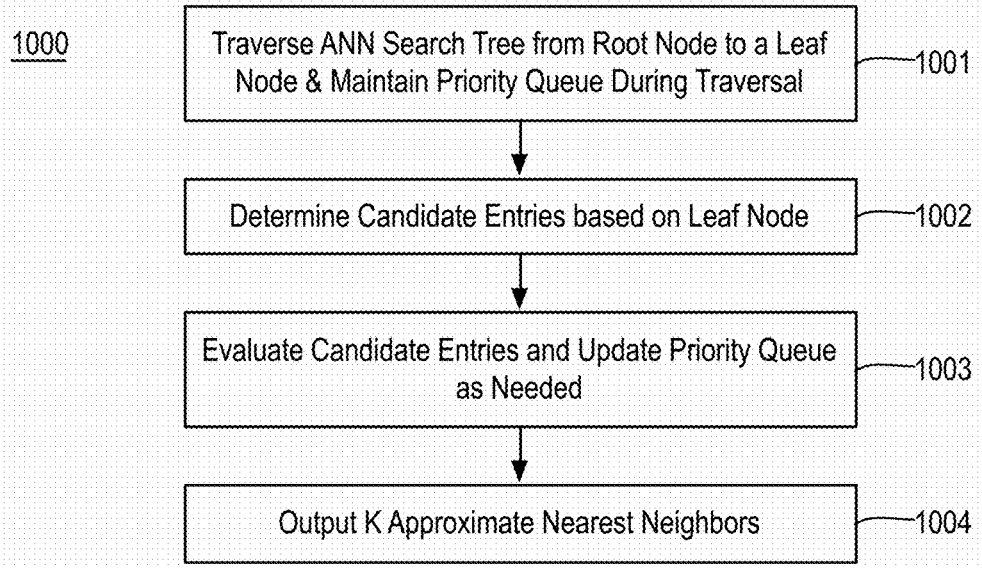
FIG. 10 is a flow diagram illustrating an example process for approximate nearest neighbor searching.

FIG. 10 is a flow diagram illustrating an example process 1000 for approximate nearest neighbor searching, arranged in accordance with at least some implementations of the present disclosure. Process 1000 may include one or more operations 1001-1004 as illustrated in FIG. 10. Process 1000 may form at least part of an approximate nearest neighbor searching technique. By way of non-limiting example, process 1000 may form at least part of an approximate nearest neighbor searching technique performed by device 100 as discussed herein. Furthermore, process 1000 will be described herein with reference to system 1300 of FIG. 13.

Figure 11:
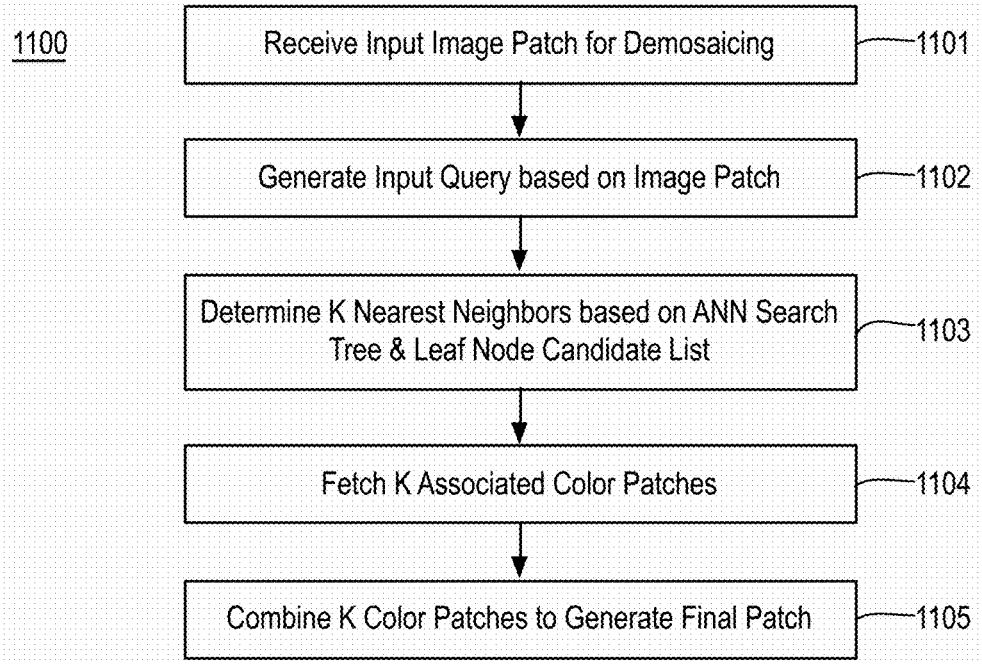
FIG. 11 is a flow diagram illustrating an example process for performing example based demosaicing.

FIG. 11 is a flow diagram illustrating an example process 1100 for performing example based demosaicing, arranged in accordance with at least some implementations of the present disclosure. Process 1100 may include one or more operations 1101-1105 as illustrated in FIG. 11. Process 1100 may form at least part of an example based demosaicing technique. By way of non-limiting example, process 1100 may form at least part of an example based demosaicing technique performed by device 500 as discussed herein. Furthermore, process 1100 will be described herein with reference to system 1300 of FIG. 13.

Figure 12:
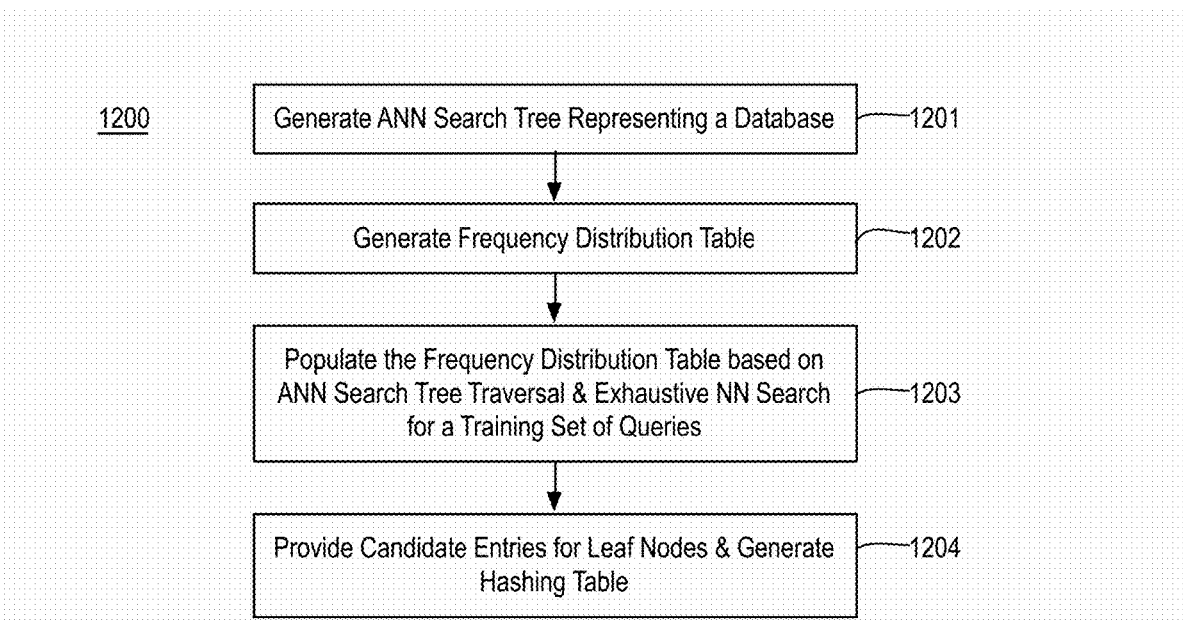
FIG. 12 is a flow diagram illustrating an example process for generating an approximate nearest neighbor searching structure.

FIG. 12 is a flow diagram illustrating an example process 1200 for generating an approximate nearest neighbor searching structure, arranged in accordance with at least some implementations of the present disclosure. Process 1200 may include one or more operations 1201-1204 as illustrated in FIG. 12. Process 1200 may form at least part of an approximate nearest neighbor searching structure generation technique. By way of non-limiting example, process 1200 may form at least part of an approximate nearest neighbor searching structure generation technique performed by device 800 as discussed herein. Furthermore, process 1200 will be described herein with reference to system 1300 of FIG. 13.

Figure 13:
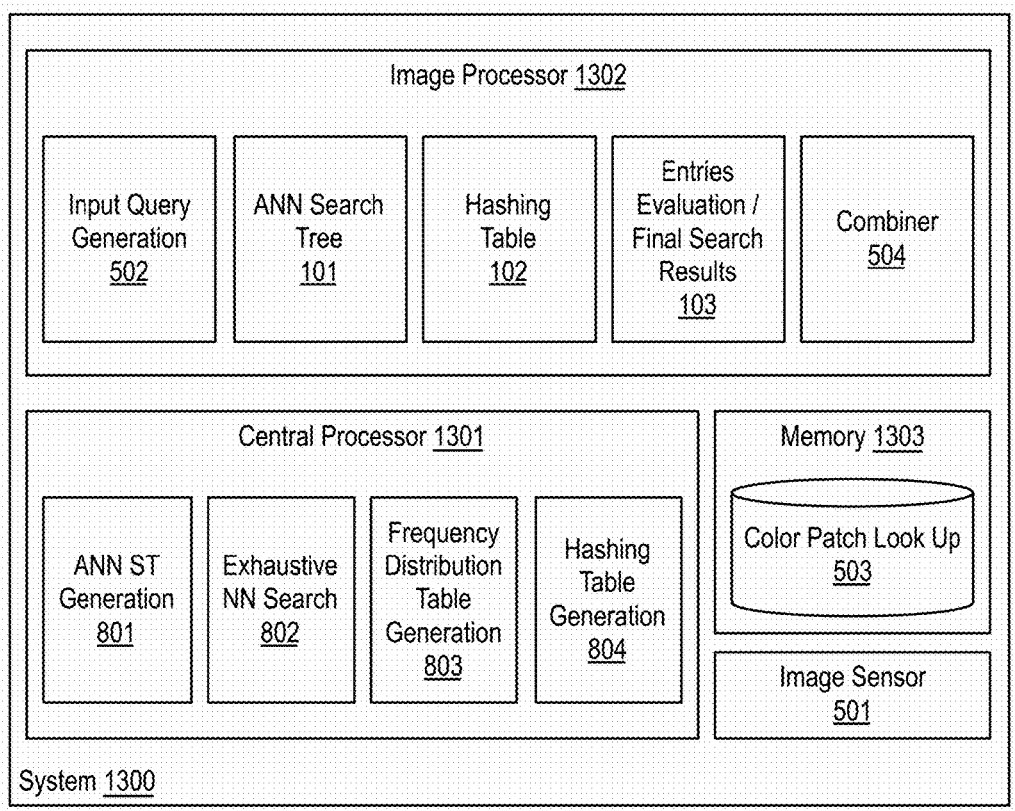
FIG. 13 is an illustrative diagram of an example system.

FIG. 13 is an illustrative diagram of an example system 1300, arranged in accordance with at least some implementations of the present disclosure. As shown in FIG. 13, system 1300 may include a central processor 1301, an image processor 1302, a memory 1303, and image sensor 501. Also as shown, image processor 1302 may include or implement input query generation module 502, ANN search tree module 101, hashing table module 102, entries evaluation/final search results module 103, and combiner 504. Central processor 1301 may include or implement ANN ST generation module 801, exhaustive NN search module 802, frequency distribution table generation module 803, and hashing table generation module 804. Furthermore, memory 1303 may include or implement color patch look up module 503. Such components or modules may be implemented to perform operations as discussed herein. In the example of system 1300, memory 1303 may include color patch look up module 503. Memory 1303 may also store search trees, hashing tables, input queries, databases, node information, node thresholds, distance values, candidate entries, pointers, priority queues, search results, image data, color patch data, image patch data, training sets, frequency table data, hashing table data, or any other data discussed herein.

As shown, in some examples, input query generation module 502, ANN search tree module 101, hashing table module 102, entries evaluation/final search results module 103, and combiner 504 may be implemented via image processor 1302. In other examples, one or more or portions of input query generation module 502, ANN search tree module 101, hashing table module 102, entries evaluation/final search results module 103, and combiner 504 may be implemented via central processor 1301 or a graphics processor. In yet other examples, one or more or portions of input query generation module 502, ANN search tree module 101, hashing table module 102, entries evaluation/final search results module 103, and combiner 504 may be implemented via an imaging processing pipeline or unit.

Image processor 1302 may include any number and type of graphics or image processing units that may provide the operations as discussed herein. In some examples, image processor 1302 may be an image signal processor. Such operations may be implemented via software or hardware or a combination thereof. For example, image processor 1302 may include circuitry dedicated to manipulate image data obtained from memory 1303. Central processor 1301 may include any number and type of processing units or modules that may provide control and other high level functions for system 1300 and/or provide any operations as discussed herein. Memory 1303 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1303 may be implemented by cache memory.

In an embodiment, one or more or portions of input query generation module 502, ANN search tree module 101, hashing table module 102, entries evaluation/final search results module 103, and combiner 504 may be implemented via an execution unit (EU) of image processor 1302. The EU may include, for example, programmable logic or circuitry such as a logic core or cores that may provide a wide array of programmable logic functions. In an embodiment, one or more or portions of input query generation module 502, ANN search tree module 101, hashing table module 102, entries evaluation/final search results module 103, and combiner 504 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of input query generation module 502, ANN search tree module 101, hashing table module 102, entries evaluation/final search results module 103, and combiner 504 may be implemented via an application specific integrated circuit (ASIC). The ASIC may include an integrated circuitry customized to perform the operations discussed herein.

Returning to discussion of FIG. 10, process 1000 may provide for approximate nearest neighbor searching and process 1000 may begin at operation 1001, where, based on an input query, an approximate nearest neighbor search tree may be traversed from a root node to a resultant leaf node of multiple leaf nodes and a priority queue of best match entries may be maintained during the traversal such that the approximate nearest neighbor search tree includes entries of a database. For example, ANN search tree module 101 as implemented via image processor 1302 may traverse the approximate nearest neighbor search tree and maintain the priority queue of best match entries. The approximate nearest neighbor search tree may include any suitable search tree. In an embodiment, the approximate nearest neighbor search tree is a balanced vantage point search tree. Furthermore, the approximate nearest neighbor search tree may be traversed using any suitable technique or techniques. In an embodiment, traversing the approximate nearest neighbor search tree comprises a single unidirectional traversal. The priority queue may be maintained using any suitable technique or techniques. In an embodiment, maintaining the priority queue may include, at an individual node of the approximate nearest neighbor search tree, determining a distance between the input query and a database entry of the individual node and, if the distance is less than any distance associated with any entry of the priority queue, replacing an entry associated with a maximum distance with the database entry of the individual node.

Processing may continue at operation 1002, where, based on the resultant leaf node, one or more candidate entries of the database associated with the resultant leaf node may be determined. For example, hashing table module 102 as implemented via image processor 1302 may determine the one or more candidate entries. The candidate entries may be determined using any suitable technique or techniques. In an embodiment, determining the one or more candidate entries includes accessing a hashing table with a key comprising an index of the resultant leaf node. Furthermore, the hashing table may include any suitable data structure. In an embodiment, hashing table includes pointers to the plurality of candidate entries.

Processing may continue at operation 1003, where the one or more candidate entries may be evaluated and the priority queue may be updated based on the evaluation to generate one or more final approximate nearest neighbor search results associated with the input query. For example, entries evaluation/final search results module 103 as implemented via image processor 1302 may evaluate the candidate entries and update the priority queue. The candidate entries maybe evaluated and the priority queue may be updated using any suitable technique or techniques. In an embodiment, evaluating the plurality of candidate entries and updating the priority queue includes determining a distance between the input query and each of the candidate entries and providing the final approximate nearest neighbor search results as the entries from the priority queue and/or the entries from the candidate entries associated with the smallest distances between the input query and the associated entries.

Processing may continue at operation 1004, where a particular number of approximate nearest neighbors may be outputted. For example, entries evaluation/final search results module 103 as implemented via image processor 1302 may output K approximate nearest neighbors. Such approximate nearest neighbors may be provided to any other module or processor for further processing.

Turning now to FIG. 11, process 1100 may provide for performing example based demosaicing and process 1100 may begin at operation 1101, where image data representative of values from a patch of pixel sensors of an image sensor may be received. For example, input query generation module 502 as implemented via image processor 1302 may receive image data from image sensor 501 or an image preprocessor or the like. The image data may include any suitable image data such as raw image data or the like.

Processing may continue at operation 1102, where an input query may be generated based on the received input data. For example, values for each location of the patch of pixel sensors may be combined to generate a multidimensional input query point such as a 25-diminsional input query or the like. For example, input query generation module 502 as implemented via image processor 1302 may generate the input query.

Processing may continue at operation 1103, where final search results including a particular number of approximate nearest neighbors to the input query may be determined. For example, ANN search tree module 101, hashing table module 102, and entries evaluation/final search results module 103 as implemented via image processor 1302 may determine the approximate nearest neighbors to the input query by implementing a pre-generated database of example patches represented by multidimensional database points such as a 25-diminsional database points or the like.

Processing may continue at operation 1104, where output color patches each associated with a search result of the one or more final approximate nearest neighbor search results may be determined. For example, color patch look up module 503 as implemented via memory 1303 may be accessed to determine or fetch the output color patches. The color patches may include any suitable data format such as a color patch data format, an RGB format, or the like. For example, the color patches and the final color patch determined at operation 1105 may be RGB color patches.

Processing may continue at operation 1105, where the output color patches may be combined to generate a final output color patch for the input data. For example, combiner 504 as implemented via image processor 1302 may combine the color patches retrieved at operation 1104 to generate the final output color patch. The color patches may be combined using any suitable technique or techniques such as averaging, weighted averaging, or the like.

Turning now to FIG. 12, process 1200 may provide for generating an approximate nearest neighbor searching structure and process 1200 may begin at operation 1201, where an approximate nearest neighbor search tree representing entries of a database may be generated such that the approximate nearest neighbor search tree comprises a root node and multiple leaf nodes. For example, ANN ST generation module 801 as implemented via central processor 1301 may generate the approximate nearest neighbor search tree. The database represented may include any suitable database. In an embodiment, the database may represent image patches from an image sensor or the like and process 1200 may further include associating each entry of the database with an output color patch such as an RGB color patch or the like.

Processing may continue at operation 1202, where a frequency distribution table including a table location for each combination of an entry of the database and a leaf node of the multiple leaf nodes may be generated. For example, frequency distribution table generation module 803 as implemented via central processor 1301 may generate the frequency distribution table. The frequency distribution table may be generated using any suitable technique or techniques and may include any suitable data structure.

Processing may continue at operation 1203, where the frequency distribution table may be populated with a frequency value for each table location based on a traversal of the approximate nearest neighbor search tree and an exhaustive nearest neighbor search for each of a training set of queries. For example, frequency distribution table generation module 803 as implemented via central processor 1301 may populate the frequency distribution table. The frequency distribution table may be populated with frequency values using any suitable technique or techniques. In an embodiment, populating the frequency distribution table may include traversing the approximate nearest neighbor search tree generated at operation 1201 based on an individual input query of the training set of queries to determine a resultant leaf node associated with the individual input query, performing an exhaustive nearest neighbor search of the entries of the database based on the individual input query to determine an actual nearest neighbor associated with the individual input query, and incrementing a value of the table location associated with the resultant leaf node and the actual nearest neighbor. Such processing may be repeated for any or all members of the training set of queries to populate the frequency distribution table.

Processing may continue at operation 1204, where candidate entries for the leaf nodes may be provided and a hashing table may be generated. For example, frequency distribution table generation module 803 as implemented via central processor 1301 may determine a particular number of candidate entries for each of the leaf nodes of the approximate nearest neighbor search tree generated at operation 1201 and hashing table generation module 804 as implemented via central processor 1301 may generate the hashing table based on the candidate entries for each of the leaf nodes. For example, for a particular leaf node, multiple candidate entries (e.g., a particular number of candidate entries such as M candidate entries) from the database that are the highest frequency entries of the frequency distribution table for the particular leaf node may be provided as candidate entries. Such candidate entries may be provided for each leaf nodes of the approximate nearest neighbor search tree and a hashing table may be generated based on the leaf nodes and their associated candidate entries. The hashing table may include any suitable data structure such as a leaf node index providing a key to the hashing table and the hashing table including pointers to the candidate entries such that the appropriate pointers for a leaf node may be accessed based on the key.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as image pre-processing circuitry, memory controllers, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any operation discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 14:
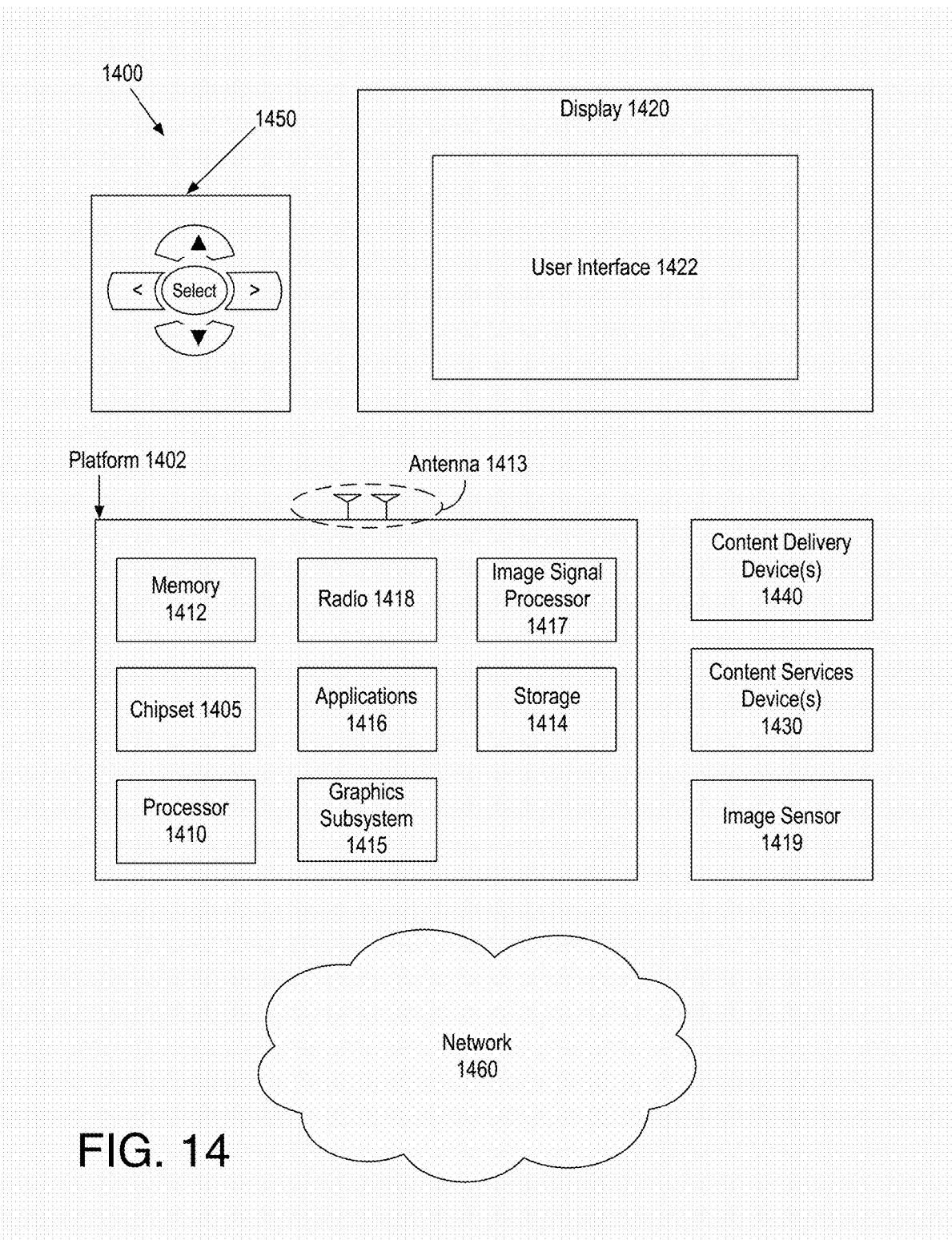
FIG. 14 is an illustrative diagram of an example system.

FIG. 14 is an illustrative diagram of an example system 1400, arranged in accordance with at least some implementations of the present disclosure. In various implementations, system 1400 may be a computing system although system 1400 is not limited to this context. For example, system 1400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 1400 includes a platform 1402 coupled to a display 1420. Platform 1402 may receive content from a content device such as content services device(s) 1430 or content delivery device(s) 1440 or other content sources such as an image sensor 1419. For example, platform 1402 may receive raw image data from image sensor 1419 or any other content source. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, antenna 1413, storage 1414, graphics subsystem 1415, applications 1416, image signal processor 1417 and/or radio 1418. Chipset 1405 may provide intercommunication among processor 1410, memory 1412, storage 1414, graphics subsystem 1415, applications 1416, image signal processor 1417 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Image signal processor 1417 may be implemented as a specialized digital signal processor or the like used for image processing. In some examples, image signal processor 1417 may be implemented based on a single instruction multiple data or multiple instruction multiple data architecture or the like. In some examples, image signal processor 1417 may be characterized as a media processor. As discussed herein, image signal processor 1417 may be implemented based on a system on a chip architecture and/or based on a multi-core architecture.

Graphics subsystem 1415 may perform processing of images such as still or video for display. Graphics subsystem 1415 may be a graphics processing unit (GPU), a visual processing unit (VPU), or an image processing unit, for example. In some examples, graphics subsystem 1415 may perform scanned image rendering as discussed herein. An analog or digital interface may be used to communicatively couple graphics subsystem 1415 and display 1420. For example, the interface may be any of a High-Definition Multimedia Interface, DisplayPort, wireless HDMI, and/or wireless HD compliant techniques. Graphics subsystem 1415 may be integrated into processor 1410 or chipset 1405. In some implementations, graphics subsystem 1415 may be a stand-alone device communicatively coupled to chipset 1405.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any flat panel monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of uni-directionally or bi-directionally communicating content between content providers and platform 1402 and/display 1420, via network 1460 or directly. It will be appreciated that the content may be communicated uni-directionally and/or bi-directionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

Image sensor 1419 may include any suitable image sensor that may provide raw image data based on a scene. For example, image sensor 1419 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensor 1419 may include any device that may detect information of a scene to generate raw image data. As discussed, in some examples, system 1400 may include multiple image sensors, which may be the same or different. In some examples, image sensor 1419 may provide image capture processing or logic associated with image sensor 1419 (not shown) may provide such image capture processing. In other examples, the image capture processing discussed herein may be performed via platform 1402.

In various implementations, platform 1402 may receive control signals from navigation controller 1450 having one or more navigation features. The navigation features of navigation controller 1450 may be used to interact with user interface 1422, for example. In various embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In various embodiments, navigation controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 14.

Figure 15:
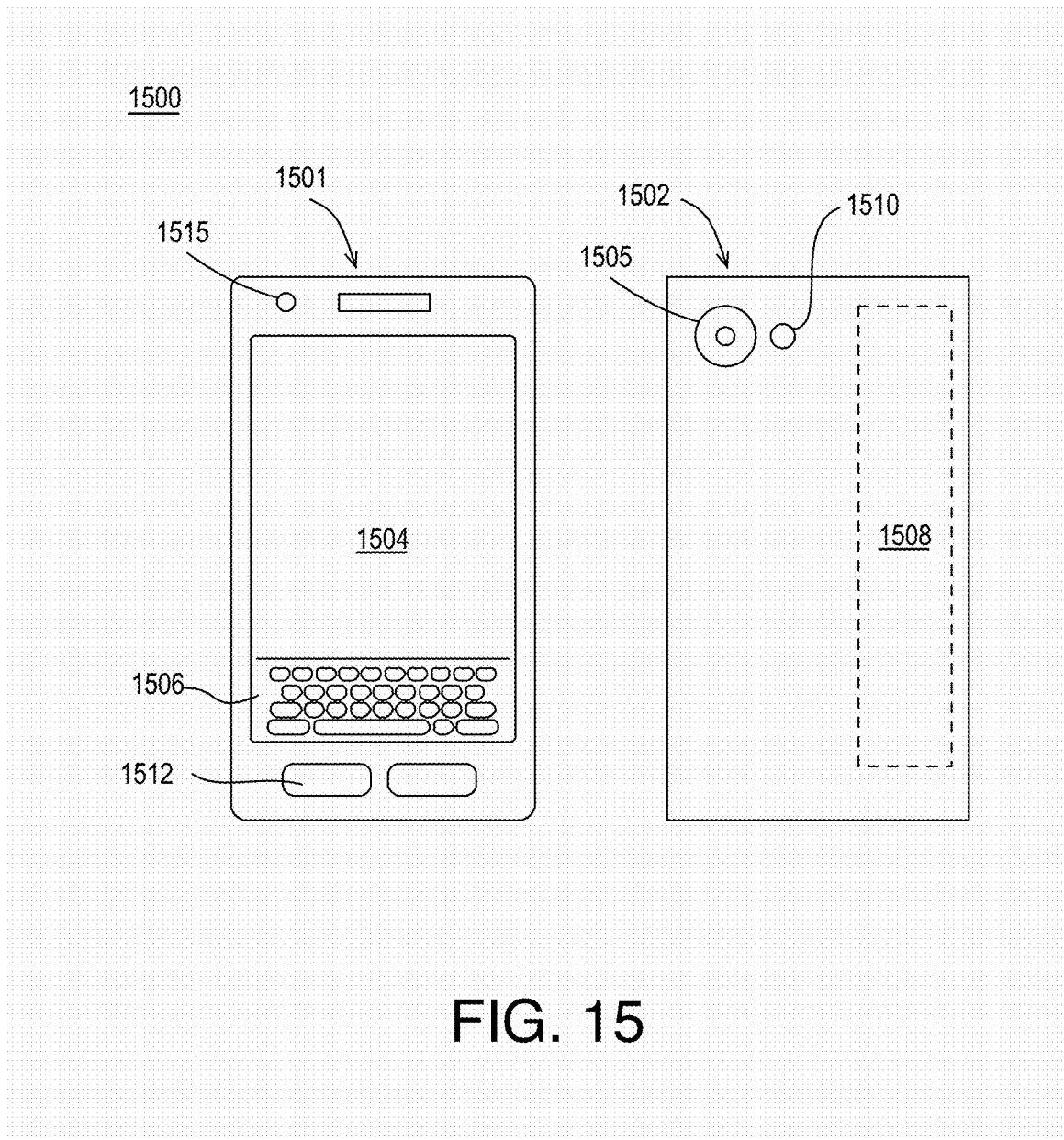
FIG. 15 illustrates an example small form factor device, all arranged in accordance with at least some implementations of the present disclosure.

As described above, system 1400 may be embodied in varying physical styles or form factors. FIG. 15 illustrates an example small form factor device 1500, arranged in accordance with at least some implementations of the present disclosure. In some examples, system 1400 may be implemented via device 1500. In other examples, other devices or systems, or portions thereof may be implemented via device 1500. In various embodiments, for example, device 1500 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1500 may include a housing with a front 1501 and a back 1502. Device 1500 includes a display 1504, an input/output (I/O) device 1506, and an integrated antenna 1508. Device 1500 also may include navigation features 1512. I/O device 1506 may include any suitable I/O device for entering information into a mobile computing device. Examples for I/O device 1506 may include an alphanumeric keyboard, a numeric keypad, a touch pad, input keys, buttons, switches, microphones, speakers, voice recognition device and software, and so forth. Information also may be entered into device 1500 by way of microphone (not shown), or may be digitized by a voice recognition device. As shown, device 1500 may include a camera 1505 (e.g., including a lens, an aperture, and an imaging sensor) and a flash 1510 integrated into back 1502 (or elsewhere) of device 1500 and a camera 1515 integrated into front 1501 of device 1500. Camera 1505 and flash 1510 and/or camera 1515 may be components of a camera module to originate image data processed into streaming video that is output to display 1504 and/or communicated remotely from device 1500 via antenna 1508 for example. For example, camera 1505 may include image sensor 101 and camera 1515 may include image sensor 102.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for approximate nearest neighbor searching comprises traversing, based on an input query, an approximate nearest neighbor search tree from a root node to a resultant leaf node of a plurality of leaf nodes and maintaining a priority queue of best match entries during the traversal, wherein the approximate nearest neighbor search tree comprises entries of a database, determining, based on the resultant leaf node, one or more candidate entries of the database associated with the resultant leaf node, and evaluating the one or more candidate entries and updating the priority queue based on the evaluation to generate one or more final approximate nearest neighbor search results associated with the input query.

Further to the first embodiments, determining the one or more candidate entries comprises accessing a hashing table with a key comprising an index of the resultant leaf node.

Further to the first embodiments, determining the one or more candidate entries comprises accessing a hashing table with a key comprising an index of the resultant leaf node and the hashing table comprises pointers to the plurality of candidate entries.

Further to the first embodiments, maintaining the priority queue comprises, at an individual node of the approximate nearest neighbor search tree, determining a distance between the input query and a database entry of the individual node and, if the distance is less than any distance associated with any entry of the priority queue, replacing an entry associated with a maximum distance with the database entry of the individual node.

Further to the first embodiments, evaluating the plurality of candidate entries and updating the priority queue comprises determining a distance between the input query and each of the candidate entries and providing the final approximate nearest neighbor search results as the entries from the priority queue and/or the entries from the candidate entries associated with the smallest distances between the input query and the associated entries.

Further to the first embodiments, the nearest neighbor search tree comprises a balanced vantage point search tree.

Further to the first embodiments, traversing the approximate nearest neighbor search tree comprises a single unidirectional traversal.

Further to the first embodiments, the nearest neighbor search tree comprises a balanced vantage point search tree and traversing the approximate nearest neighbor search tree comprises a single unidirectional traversal.

Further to the first embodiments, the method further comprises receiving image data representative of values from a patch of pixel sensors of an image sensor, generating the input query based on the received input data, determining a plurality of output color patches each associated with a search result of the one or more final approximate nearest neighbor search results, and combining the output color patches to generate a final output color patch for the input data.

Further to the first embodiments, the method further comprises receiving image data representative of values from a patch of pixel sensors of an image sensor, generating the input query based on the received input data, determining a plurality of output color patches each associated with a search result of the one or more final approximate nearest neighbor search results, and combining the output color patches to generate a final output color patch for the input data, wherein the image sensor comprises a Bayer image sensor and the final output color patch comprises an RGB color patch.

In one or more second embodiments, a system for approximate nearest neighbor searching comprises a memory configured to store an approximate nearest neighbor search tree comprising entries of a database and an image processor coupled to the memory, the image processor to traverse, based on an input query, the approximate nearest neighbor search tree from a root node to a resultant leaf node of a plurality of leaf nodes and maintain a priority queue of best match entries during the traversal, to determine, based on the resultant leaf node, one or more candidate entries of the database associated with the resultant leaf node, and to evaluate the one or more candidate entries and update the priority queue based on the evaluation to generate one or more final approximate nearest neighbor search results associated with the input query.

Further to the second embodiments, the image processor to determine the one or more candidate entries comprises the image processor to access a hashing table comprising pointers to the plurality of candidate entries with a key comprising an index of the resultant leaf node.

Further to the second embodiments, the hashing table comprises pointers to the plurality of candidate entries.

Further to the second embodiments, the image processor to maintain the priority queue comprises, at an individual node of the approximate nearest neighbor search tree, the image processor to determine a distance between the input query and a database entry of the individual node and, if the distance is less than any distance associated with any entry of the priority queue, to replace an entry associated with a maximum distance with the database entry of the individual node.

Further to the second embodiments, the image processor to evaluate the plurality of candidate entries and update the priority queue comprises the image processor to determine a distance between the input query and each of the candidate entries and to provide the final approximate nearest neighbor search results as the entries from the priority queue and/or the entries from the candidate entries associated with the smallest distances between the input query and the associated entries.

Further to the second embodiments, the nearest neighbor search tree comprises a balanced vantage point search tree and the image processor to traverse the approximate nearest neighbor search tree comprises the image processor to perform a single unidirectional traversal.

Further to the second embodiments, the image processor is further to receive image data representative of values from a patch of pixel sensors of an image sensor, to generate the input query based on the received input data, to determine a plurality of output color patches each associated with a search result of the one or more final approximate nearest neighbor search results, and to combine the output color patches to generate a final output color patch for the input data.

In one or more third embodiments, a method for providing an approximate nearest neighbor searching structure comprises generating an approximate nearest neighbor search tree representing entries of a database, wherein the approximate nearest neighbor search tree comprises a root node and a plurality of leaf nodes, generating a frequency distribution table comprising a table location for each combination of an entry of the database and a leaf node of the plurality of leaf nodes, populating the frequency distribution table with a frequency value for each table location based on a traversal of the approximate nearest neighbor search tree and an exhaustive nearest neighbor search for each of a training set of queries, and providing, for a first leaf node, a plurality of candidate entries from the database comprising the highest frequency entries of the frequency distribution table for the first leaf node.

Further to the third embodiments, populating the frequency distribution table comprises traversing the approximate nearest neighbor search tree based on an individual input query of the training set of queries to determine a resultant leaf node associated with the individual input query, performing an exhaustive nearest neighbor search of the entries of the database based on the individual input query to determine an actual nearest neighbor associated with the individual input query, and incrementing a value of the table location associated with the resultant leaf node and the actual nearest neighbor.

Further to the third embodiments, the method further comprises providing a plurality of candidate entries for each of the remaining leaf nodes of the plurality of leaf nodes and generating a hashing table based on the leaf nodes and their associated candidate entries.

Further to the third embodiments, the method further comprises providing a plurality of candidate entries for each of the remaining leaf nodes of the plurality of leaf nodes and generating a hashing table based on the leaf nodes and their associated candidate entries, wherein the hashing table comprises pointers to the of candidate entries.

Further to the third embodiments, each entry of the database comprises a value representative of a patch from an image sensor and the method further comprises associating each entry of the database with an output color patch.

In one or more fourth embodiments, a system for providing an approximate nearest neighbor searching structure comprises a processor coupled to the memory, the processor to generate an approximate nearest neighbor search tree representing entries of a database, wherein the approximate nearest neighbor search tree comprises a root node and a plurality of leaf nodes, to generate a frequency distribution table comprising a table location for each combination of an entry of the database and a leaf node of the plurality of leaf nodes, to populate the frequency distribution table with a frequency value for each table location based on a traversal of the approximate nearest neighbor search tree and an exhaustive nearest neighbor search for each of a training set of queries, and to provide, for a first leaf node, a plurality of candidate entries from the database comprising the highest frequency entries of the frequency distribution table for the first leaf node and a memory configured to store the plurality of candidate entries.

Further to the fourth embodiments, the processor to populate the frequency distribution table comprises the processor to traverse the approximate nearest neighbor search tree based on an individual input query of the training set of queries to determine a resultant leaf node associated with the individual input query, to perform an exhaustive nearest neighbor search of the entries of the database based on the individual input query to determine an actual nearest neighbor associated with the individual input query, and to increment a value of the table location associated with the resultant leaf node and the actual nearest neighbor.

Further to the fourth embodiments, the processor is further to provide a plurality of candidate entries for each of the remaining leaf nodes of the plurality of leaf nodes and to generate a hashing table based on the leaf nodes and their associated candidate entries.

Further to the fourth embodiments, the processor is further to provide a plurality of candidate entries for each of the remaining leaf nodes of the plurality of leaf nodes and to generate a hashing table based on the leaf nodes and their associated candidate entries and the hashing table comprises pointers to the of candidate entries.

Further to the fourth embodiments, each entry of the database comprises a value representative of a patch from an image sensor and the method further comprises associating each entry of the database with an output color patch.

In one or more fifth embodiments, at least one machine readable medium may include a plurality of instructions that, in response to being executed on a computing device, cause the computing device to perform a method or any functions according to any one of the above embodiments.

In one or more sixth embodiments, an apparatus or a system may include means for performing a method or any functions according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for approximate nearest neighbor searching comprising:
   receiving an input query based on image data representative of values from a patch of pixel sensors of an image sensor;
   traversing, based on the input query, an approximate nearest neighbor search tree from a root node to a resultant leaf node of a plurality of leaf nodes and maintaining a priority queue of best match entries during the traversal, wherein the approximate nearest neighbor search tree comprises entries of a database;
   determining, based on the resultant leaf node, one or more candidate entries of the database associated with the resultant leaf node;
   evaluating the one or more candidate entries and updating the priority queue based on the evaluation to generate one or more final approximate nearest neighbor search results associated with the input query, wherein evaluating the one or more candidate entries and updating the priority queue comprises determining a distance between the input query and each of the candidate entries and providing the one or more final approximate nearest neighbor search results as one or more entries from the priority queue and/or one or more entries from the candidate entries associated with the smallest distance or distances between the input query and the associated entry or entries;
   determining one or more output color patches each associated with the one or more final approximate nearest neighbor search results; and
   generating a final output color patch for the image data based on the one or more output color patches.

2. The method of claim 1, wherein determining the one or more candidate entries comprises accessing a hashing table with a key comprising an index of the resultant leaf node.

3. The method of claim 2, wherein the hashing table comprises pointers to the one or more candidate entries.

4. The method of claim 1, wherein maintaining the priority queue comprises, at an individual node of the approximate nearest neighbor search tree, determining a distance between the input query and a database entry of the individual node and, if the distance is less than any distance associated with any entry of the priority queue, replacing an entry associated with a maximum distance with the database entry of the individual node.

5. The method of claim 1, wherein the nearest neighbor search tree comprises a balanced vantage point search tree and traversing the approximate nearest neighbor search tree comprises a single unidirectional traversal.

6. The method of claim 1, wherein the image sensor comprises a Bayer image sensor and the final output color patch comprises an RGB color patch.

7. A method for providing an approximate nearest neighbor searching structure comprising:
   generating an approximate nearest neighbor search tree representing entries of a database, wherein the approximate nearest neighbor search tree comprises a root node and a plurality of leaf nodes, and wherein each entry of the database comprises a value representative of a patch from an image sensor;
   generating a frequency distribution table comprising a table location for each combination of an entry of the database and a leaf node of the plurality of leaf nodes;
   populating the frequency distribution table with a frequency value for each table location based on a traversal of the approximate nearest neighbor search tree and an exhaustive nearest neighbor search for each of a training set of queries, wherein populating the frequency distribution table comprises:
      traversing the approximate nearest neighbor search tree based on an individual input query of the training set of queries to determine a resultant leaf node associated with the individual input query;
      performing an exhaustive nearest neighbor search of the entries of the database based on the individual input query to determine an actual nearest neighbor associated with the individual input query; and
      incrementing a value of the table location associated with the resultant leaf node and the actual nearest neighbor;

providing, for a first leaf node, a plurality of candidate entries from the database comprising the highest frequency entries of the frequency distribution table for the first leaf node; and associating each entry of the database with an output color patch.

8. The method of claim 7, further comprising:

providing a plurality of candidate entries for each of the remaining leaf nodes of the plurality of leaf nodes; and generating a hashing table based on the leaf nodes and their associated candidate entries.

9. The method of claim 8, wherein the hashing table comprises pointers to the of candidate entries.

10. A system for approximate nearest neighbor searching comprising:

a memory configured to store an approximate nearest neighbor search tree comprising entries of a database; and a processor coupled to the memory, the processor to receive an input query based on image data representative of values from a patch of pixel sensors of an image sensor, to traverse, based on the input query, the approximate nearest neighbor search tree from a root node to a resultant leaf node of a plurality of leaf nodes and maintain a priority queue of best match entries during the traversal, to determine, based on the resultant leaf node, one or more candidate entries of the database associated with the resultant leaf node, to evaluate the one or more candidate entries and update the priority queue based on the evaluation to generate one or more final approximate nearest neighbor search results associated with the input query, wherein the processor to evaluate the one or more candidate entries and update the priority queue comprises the processor to determine a distance between the input query and each of the candidate entries and to provide the one or more final approximate nearest neighbor search results as one or more entries from the priority queue and/or one or more entries from the candidate entries associated with the smallest distance or distances between the input query and the associated entry or entries, to determine one or more output color patches each associated with the one or more final approximate nearest neighbor search results, and to generate a final output color patch for the image data based on the one or more output color patches.

11. The system of claim 10, wherein the processor to determine the one or more candidate entries comprises the processor to access a hashing table comprising pointers to the one or more candidate entries with a key comprising an index of the resultant leaf node.

12. The system of claim 10, wherein the processor to maintain the priority queue comprises, at an individual node of the approximate nearest neighbor search tree, the processor to determine a distance between the input query and a database entry of the individual node and, if the distance is less than any distance associated with any entry of the priority queue, to replace an entry associated with a maximum distance with the database entry of the individual node.

13. The system of claim 10, wherein the nearest neighbor search tree comprises a balanced vantage point search tree and the processor to traverse the approximate nearest neighbor search tree comprises the processor to perform a single unidirectional traversal.

14. At least one non-transitory machine readable medium comprising a plurality of instructions that, in response to being executed on a device, cause the device to perform approximate nearest neighbor searching by:

receiving an input query based on image data representative of values from a patch of pixel sensors of an image sensor;

traversing, based on the input query, an approximate nearest neighbor search tree from a root node to a resultant leaf node of a plurality of leaf nodes and maintaining a priority queue of best match entries during the traversal, wherein the approximate nearest neighbor search tree comprises entries of a database;

determining, based on the resultant leaf node, one or more candidate entries of the database associated with the resultant leaf node;

evaluating the one or more candidate entries and updating the priority queue based on the evaluation to generate one or more final approximate nearest neighbor search results associated with the input query, wherein evaluating the one or more candidate entries and updating the priority queue comprises determining a distance between the input query and each of the candidate entries and providing the one or more final approximate nearest neighbor search results as one or more entries from the priority queue and/or one or more entries from the candidate entries associated with the smallest distances or distances between the input query and the associated entry or entries;

determining one or more output color patches each associated with the one or more final approximate nearest neighbor search results; and generating a final output color patch for the image data based on the one or more output color patches.

15. The non-transitory machine readable medium of claim 14, wherein determining the one or more candidate entries comprises accessing a hashing table comprising pointers to the one or more candidate entries with a key comprising an index of the resultant leaf node.

16. The non-transitory machine readable medium of claim 14, wherein maintaining the priority queue comprises, at an individual node of the approximate nearest neighbor search tree, determining a distance between the input query and a database entry of the individual node and, if the distance is less than any distance associated with any entry of the priority queue, replacing an entry associated with a maximum distance with the database entry of the individual node.

17. The non-transitory machine readable medium of claim 14, wherein the nearest neighbor search tree comprises a balanced vantage point search tree and traversing the approximate nearest neighbor search tree comprises a single unidirectional traversal.

18. The non-transitory machine readable medium of claim 14, wherein the image sensor comprises a Bayer image sensor and the final output color patch comprises an RGB color patch.

19. The system of claim 10, wherein the image sensor comprises a Bayer image sensor and the final output color patch comprises an RGB color patch.

* * * * *